United States Patent
Sferco

[11] Patent Number: 6,145,394
[45] Date of Patent: Nov. 14, 2000

[54] MECHANISM FOR MOVEMENT TRANSMISSION IN PISTON ENGINES

[76] Inventor: Rubén Juan Sferco, Lafimur 4050 Barrio Urca, 5009 Córdoba, Province of Córdoba, Argentina

[21] Appl. No.: 09/253,663

[22] Filed: Feb. 19, 1999

[30] Foreign Application Priority Data

Feb. 19, 1998 [AR] Argentina ..................... 98 01 00735

[51] Int. Cl.$^7$ .................................................. F16H 37/12
[52] U.S. Cl. ........................................... 74/52; 579/593 E
[58] Field of Search .......................... 74/52, 593, 579 E, 74/450; 123/53.6, 55.2, 197.4

[56] References Cited

U.S. PATENT DOCUMENTS

| | | | |
|---|---|---|---|
| 1,579,083 | 3/1926 | Collins | 74/52 |
| 1,811,625 | 6/1931 | Greening et al. | 74/579 E X |
| 1,888,448 | 11/1932 | Brant | 74/52 |
| 2,223,100 | 11/1940 | Foster | 74/52 |
| 2,461,056 | 2/1949 | Hess | 74/579 E X |
| 3,492,887 | 2/1970 | Ellinger | 74/450 |
| 3,751,080 | 8/1973 | Bailey et al. | 74/579 E X |
| 4,173,151 | 11/1979 | Grundy | 74/52 X |
| 4,270,395 | 6/1981 | Grundy | 74/52 X |
| 5,782,213 | 7/1998 | Pedersen | 123/197.4 X |
| 6,024,067 | 2/2000 | Takachi et al. | 123/197.4 X |

*Primary Examiner*—Rodney H. Bonck
*Attorney, Agent, or Firm*—Evenson, McKeown, Edwards & Lenahan, P.L.L.C.

[57] ABSTRACT

This invention relates to a transmission mechanism that allows the transformation of linear movement into circular movement and vice-versa and may be applied to any machine where such a transformation is required. This mechanism includes connecting rods mounted on eccentric wheels, which are in turn connected to the elbow of the crankshaft. Due to this special disposition, these rods do not move in the traditional oscillating manner but only in linear form. Each connecting rod and its piston are cast as a single, light metal piece, without the use of connecting pins. The piston length need not be greater than strictly necessary for holding the ring. The connecting rod length is also reduced. The distance from the crankshaft axis to the cylinder-head union is not bigger than half that now typically in use. The crankshaft length is less than half the length of traditional ones. All this allows, in its use in an internal combustion engine, better thermal and mechanical efficiency, optimization of the relative weight/power and extends the engine's lifetime.

8 Claims, 5 Drawing Sheets

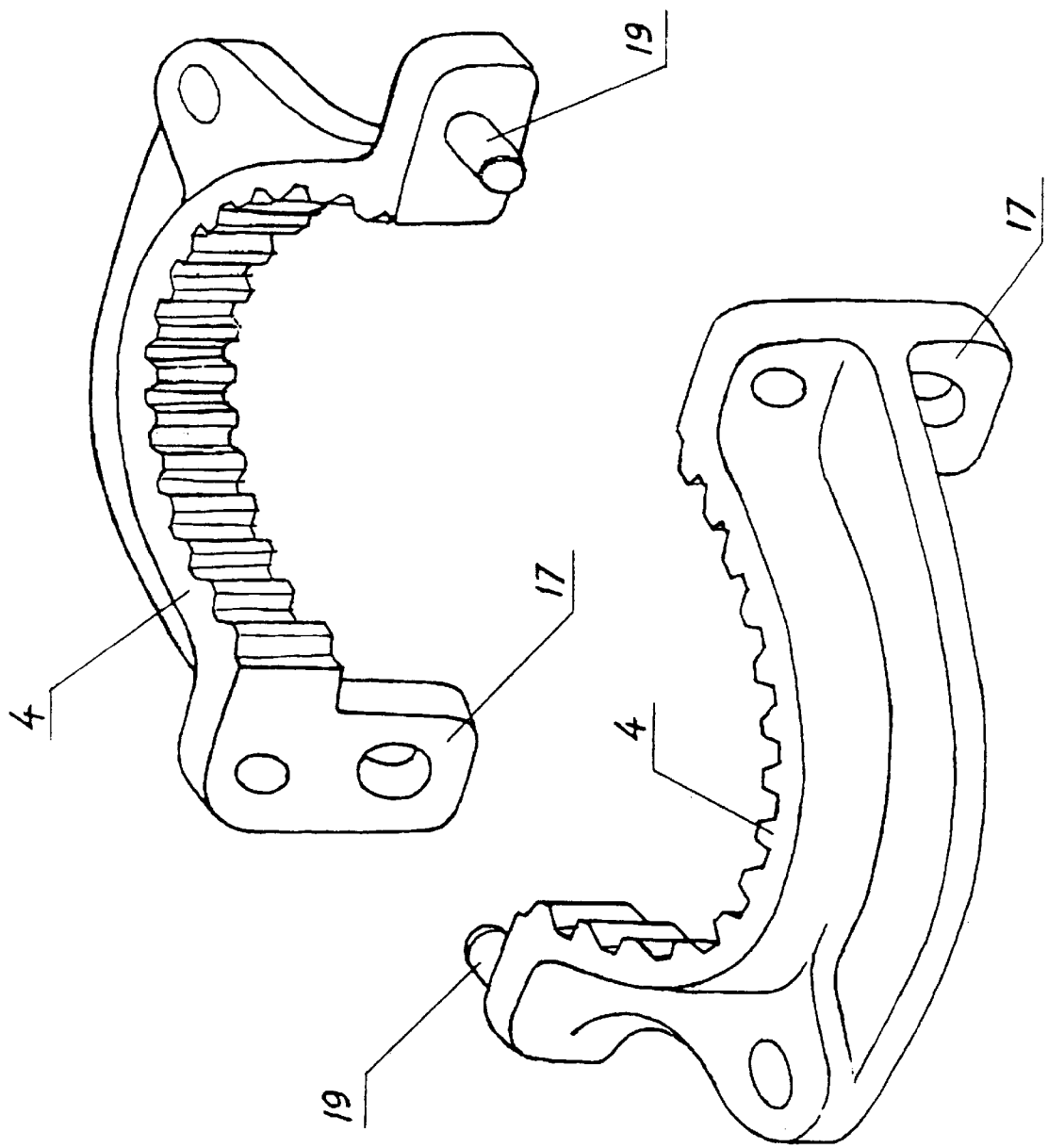

MECHANISM FOR MOVEMENT TRANSMISSION IN PISTON ENGINES

BACKGROUND AND SUMMARY OF THE INVENTION

The present invention relates to a new transmission mechanism that allows the transformation of linear movement into circular movement and vice-versa, and may be applied to any machine in which such a transformation is required.

In piston engines, linear to rotational movement transformation is obtained by a connecting rod-crankshaft mechanism working in cooperation with pistons. As an example, and in order to provide a better technical understanding of the invention and its uses and benefits, the description below refers to use of the invention in an internal combustion engine. It may be useful to keep the following in mind with respect to the basic elements that are part of a traditional internal combustion engine, such as pistons, connecting rods and a crankshaft:

1. When explosion occurs, it acts on the piston head, generating a force directed to the connecting-rod and another lateral force that presses the piston against the cylinder wall, which creates energy losses due to friction and tends to wear the cylinder into an oval shape. This frictional force reaches its maximum value immediately after the explosion, thus causing the sliding of these surfaces to occur under extreme lubricating conditions and at very high temperature, pressure and speed.
2. When the piston reaches both maximum points in its stroke, there is an abrupt inversion of movement. This acts negatively on the performance of the engine in direct proportion to the speed and mass of the group formed by the piston, piston rings, pin and one third of the connecting rod.
3. For a given cylinder volume and rpm, the torque, piston speed, and thermal performance may change as a function of the relationship between the length of the connecting rod, the piston diameter and the crankweb. Based on past experience, a "square piston" or "super square" configuration has been generalized as the preferred alternative. It is generally accepted that the efficiency depending on these three elements (connecting rod, piston and crankshaft) has reached a maximum that cannot be surpassed. Moreover, it is well known that these three elements have not undergone important changes for many years. All the advances in the performance of engines have been due to innovations in other parts of the engines (intake, valves, carburation, ignition, camshaft, distribution, etc.)

The three preceding paragraphs describe negative conditions which comprise the efficiency of an engine, and which are, among others, very well known by those skilled in the art. Several solutions have been proposed attempting to solve the problems that have been found. Among them, the Wankel rotating engine, with its over forty years of experimentation, has had limited success, but it cannot compete with the conventional engine.

The present invention utilizes the crankshaft-connecting rod-piston assembly, which are the elements that have undergone the fewest improvements, if any, in the past years. This obviously bestows on the present invention a particular importance because, far from attempting to alter all the technical evolution of other engine parts, it cooperates with them and even makes it possible to enhance their respective efficiencies.

The mechanism of the present invention comprises an assembly formed by a crankshaft having a rotatable member mounted on the crankshaft elbow. The member is shaped as two partially juxtaposed grooved wheels, one behind the other, in such a way that their geometric axes do not coincide. These axes are separated and, between both and equally distant from each other, is the turning axis that corresponds to the elbow axis. The three axes (the elbow axis and each of the wheel axes) are parallel and are on the same front-back plane. When the member rotates on the elbow, each of the wheels behaves as an eccentric, thus providing a front eccentric wheel and a rear eccentric wheel.

On the front eccentric wheel there are two bearing-mounted connecting rods with their distal ends forming the shape of a piston with no joint in between, each connecting rod being an integral piece with its own piston. The connecting rods are split-head connecting rods with the unique feature that each one has only one half of its head and is connected to the half-head of the other connecting rod by means of groove pins similar to conventional ones. In this way a pair of connecting rods opposed to each other is obtained whose longitudinal axes are common and coincident with the axis of the corresponding opposite cylinder.

On the front face of the head of this double connecting rod, an internally cogged gear or crown is attached and properly positioned. The center and the front-back axis of the crown coincide with the corresponding center and axis of the connecting rod bearing. The crown is divided into two halves, each one of which remains mounted on a corresponding connecting rod if they are separated. The crown tangentially engages the crankshaft elbow and this elbow has a gear found on or connected to the contacting segment so that as the crankshaft rotates, the gear on the elbow behaves as a satellite to the crown. The number of cogs on the crown is double that of the satellite gear.

Forming part of the connecting rod head and on opposite poles there are two planes parallel to the axis of the pistons. These planes slide between two roller holder plates, which are opposed to each other and attached to the fixed structure of the engine so as to form a channel. Inside of this channel the head of the connecting rod slides as the crankshaft turns. A similar assembly is mounted on the rear eccentric wheel, except that it does not have a crown or gear.

Therefore, one embodiment of the present invention includes an engine with two pairs of opposite cylinders and a special feature, which is completely new, allowing the movement of the connecting rods to be purely linear rather than oscillating. Another new feature is that the pair of cylinders is perpendicular one to the other in such a way that when the front connecting rods move horizontally, the rear ones move vertically. This mechanism also makes the force acting on the crankshaft elbow double in intensity compared to the expansion force.

If necessary, many assemblies can be mounted one after the other along the crankshaft in order to meet the special conditions and requirements needed for each engine. The best functional balance is obtained when four pairs of cylinders or more are used.

In conventional internal combustion engines, the inertia of the piston (the speed of which may, according to the run and rpm of the engine, reach or surpass 15 m/sec), and the many high speed movement inversions of the piston, rings, pin and connecting rod assembly, negatively effect engine operation. These effects increase mechanical losses, produce strong vibrations and intensify the friction effect of the piston against the cylinder, increasing the wear of both elements. The mechanism of the present invention minimizes these effects, mainly because there are no lateral forces of the pistons against the cylinder walls. The pistons slide inside the cylinders without theoretically making contact with them; only the rings do in their sealing function. The piston and cylinder oil gap is kept constant along the entire perimeter and at all times. This enhances the engine thermal efficiency since the engine can work at higher temperatures without the risk of the piston getting stuck inside the cylinder, as the absence of friction lowers this risk dramatically.

Due to the lack of oscillating movement of the connecting rod and the lack of lateral force of the pistons, these components do not have a tendency to pitch. This allows the piston length to be not greater than the strictly necessary one for holding the rings. The reduction in the piston length, the short length of the connecting rods, the light weight alloy they may be made of and the absence of a connecting pin help to increase the mechanical efficiency because of a reduction of mass. It is important to emphasize that each connecting rod and its piston forms a single piece. Because of the above-mentioned reductions in size, the cylinders are short. The distance from the crankshaft longitudinal axis to the cylinder-head union is not bigger than half the distance of traditional ones. The crankshaft length is also reduced and is less than half the length of traditional ones, so that its resistance to torsion shows a comparatively remarkable increase. With the proposed mechanism, the need for cooling decreases and consequently the cooling system is smaller.

In light of the foregoing description, it may be easily verified that an engine with smaller size and weight may be obtained when using the present invention. This, and the functional advantages mentioned above, confirm that the weight/power relation of the present invention is highly advantageous when applied to internal combustion engines, and compared to conventional ones. It is an object of the invention to provide an improved mechanism for movement transmission in piston engines, mainly in the transformation of linear to rotary movement therein.

For a better understanding of the present invention, a preferred embodiment of the invention will be described (as an illustrative example only and not as a limitation on the invention's scope), making reference to the attached drawings which show the essential parts of the invention.

BRIEF DESCRIPTION OF THE DRAWINGS

FIG. 3 is a perspective view of the split gear or crown.

DETAILED DESCRIPTION OF THE PREFERRED EMBODIMENTS

Figure 4:
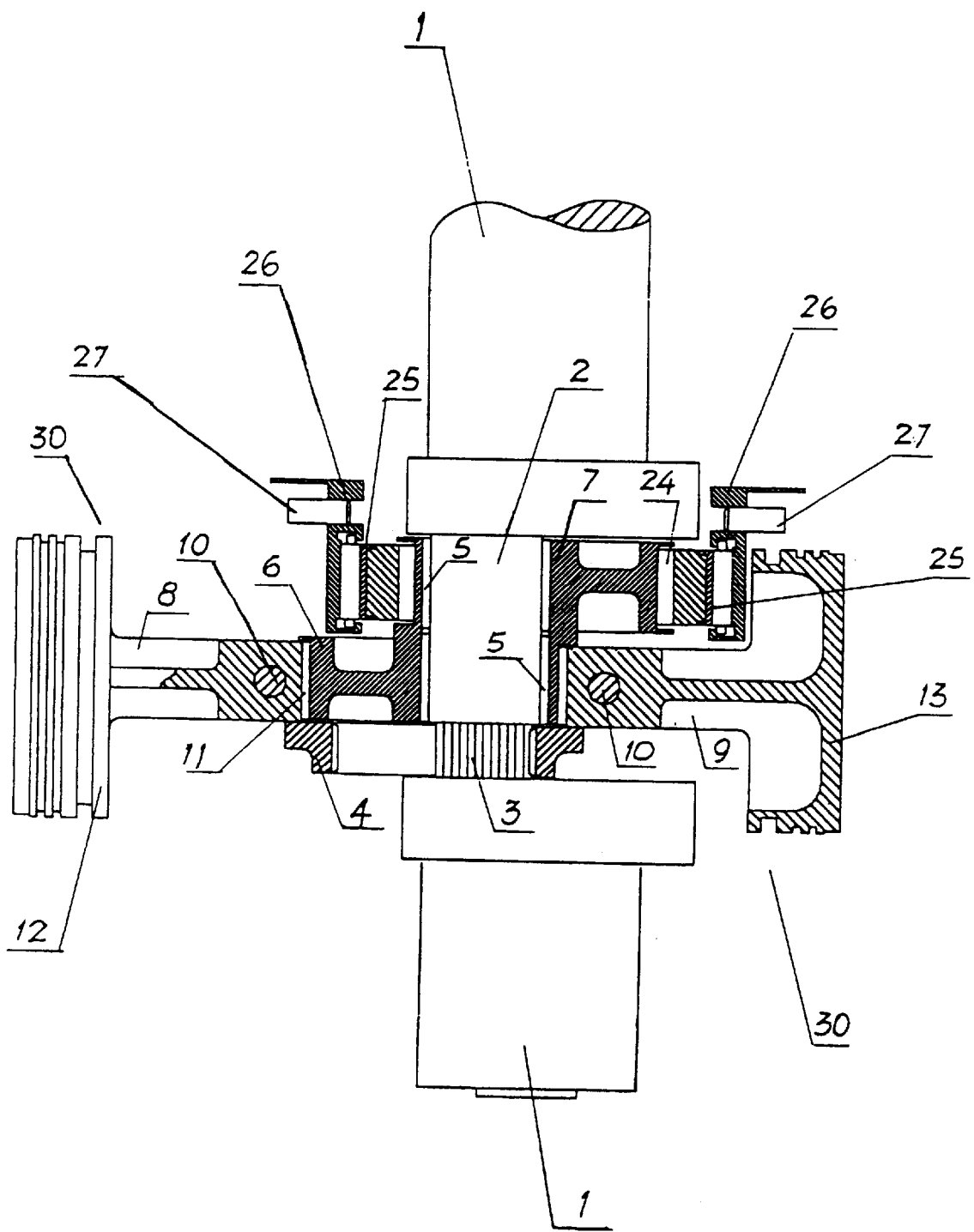
FIG. 4 is a simplified cross-sectional view, through line A—A in FIG. 1.

FIG. 4 shows the crankshaft 1 mounted conventionally in an oil pan, and on its elbow 2 the cogs of the gear 3 can be seen, acting as satellite for the crown or internal gear 4. A member in the shape of two eccentric wheels 6 and 7 is rotatably mounted on elbow 2 with anti-friction bearing 5 in between. Wheel 6 is the front wheel and wheel 7 is the rear wheel. The front eccentric wheel 6 supports two connecting rods 8 and 9, which allow rotational movement and whose heads are split and united to each other with threaded bolts 10. Connecting rods 8 and 9 are mounted on a common split anti-friction bearing 11 in such a way that the longitudinal axes of the connecting rods are coincident and each connecting rod acts as a cover of the head to the other one. The other end of each connecting rod increases in volume adopting the shape of a piston 12 and 13. This means that each connecting rod and its piston are cast as a single, light metal piece (the same alloy used for pistons) and are later machine worked. Obviously, no pin or any other type of joint is used.

Figures 1, 2:
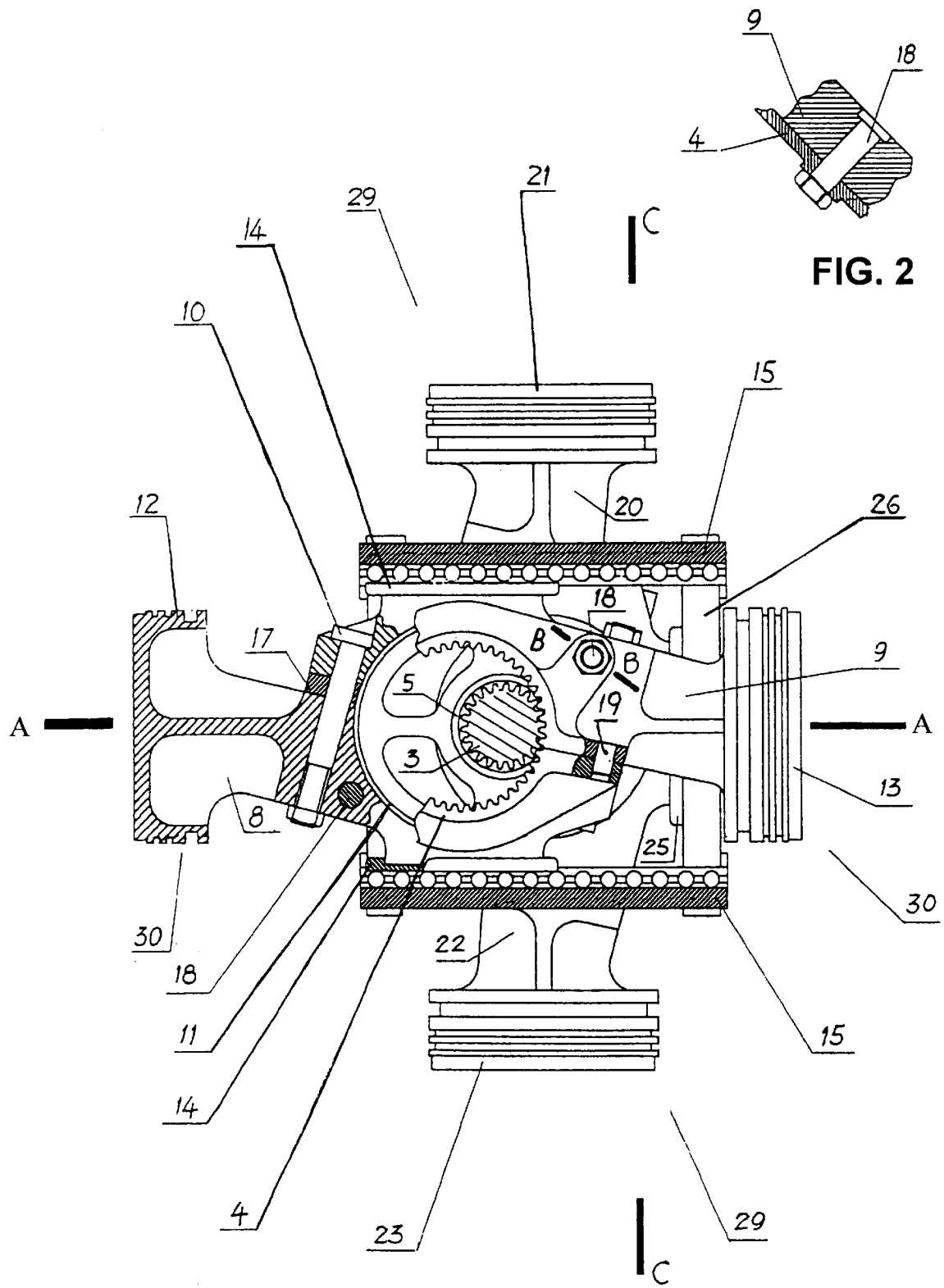
FIG. 1 is a front view of the transmission mechanism according to one embodiment of the present invention applied to an internal combustion engine with stepped cross-sectional views.
FIG. 2 is a simplified cross-sectional view, through line B—B in FIG. 1.

FIG. 1 shows that on the connecting rod head, on both opposite poles of the axis perpendicular to the longitudinal axis of the connecting rod, there is a plateau. Each of these plateaus is covered with a steel skid 14 and forms parallel planes to the longitudinal axis. These planes slide with the crankshaft movement on roller-holder plates 15. Each plate is positioned on the cylinder base through a positional pin 16 (FIG. 5) and is attached with two screws not shown on the drawings. The screws corresponding to the rear eccentric wheel are shown as reference 28 (FIG. 6).

Attached to the front face of the connecting rod head is the internal gear or crown 4, which is split in two equal halves. The gear division line coincides with the division line of the connecting rod head. This gear is fixed and kept in position by pins 10 that run through a lug 17, which is a front-back extension of the gear. The gear is also fixed by two threaded pins 18 and two splines 19. This allows the disassembling of the connecting rod head simply by removing the nuts of pins 10 such that each half of the gear will remain attached to each corresponding half of the connecting rod head when taken apart. In this way, the location of the gear will be kept unchanged, guaranteeing that during reassembling of the connecting rod head, the gear may be accurately put back together. This gear does not take part, or does so minimally, in the transmission of the expansive force to the crankshaft. The eccentric wheels supply this function and the gear only participates as an aid to movement.

Figure 6:
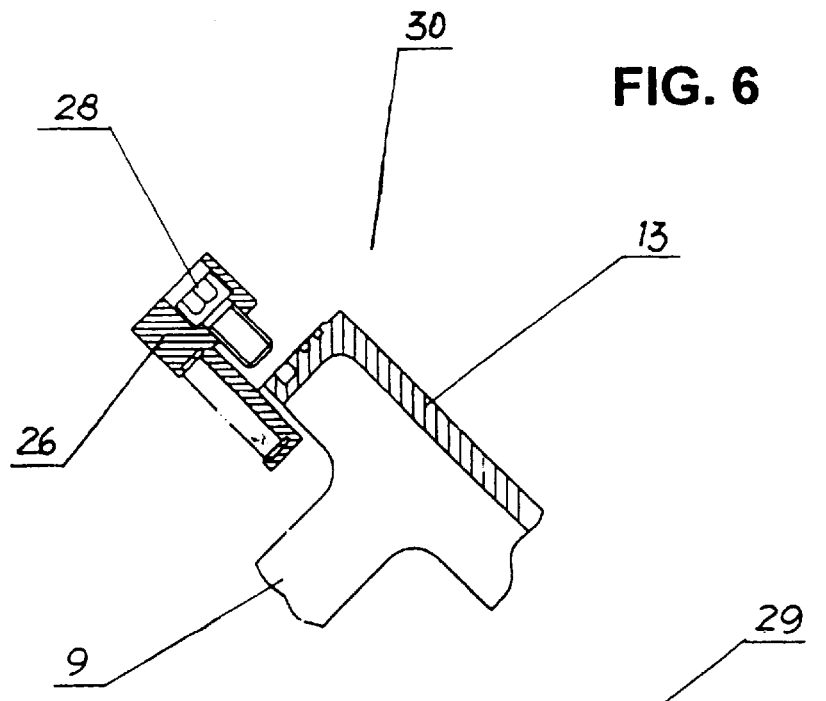
FIG. 6 is a simplified cross-sectional view, through line A—A in FIG. 5.
Figure 5:
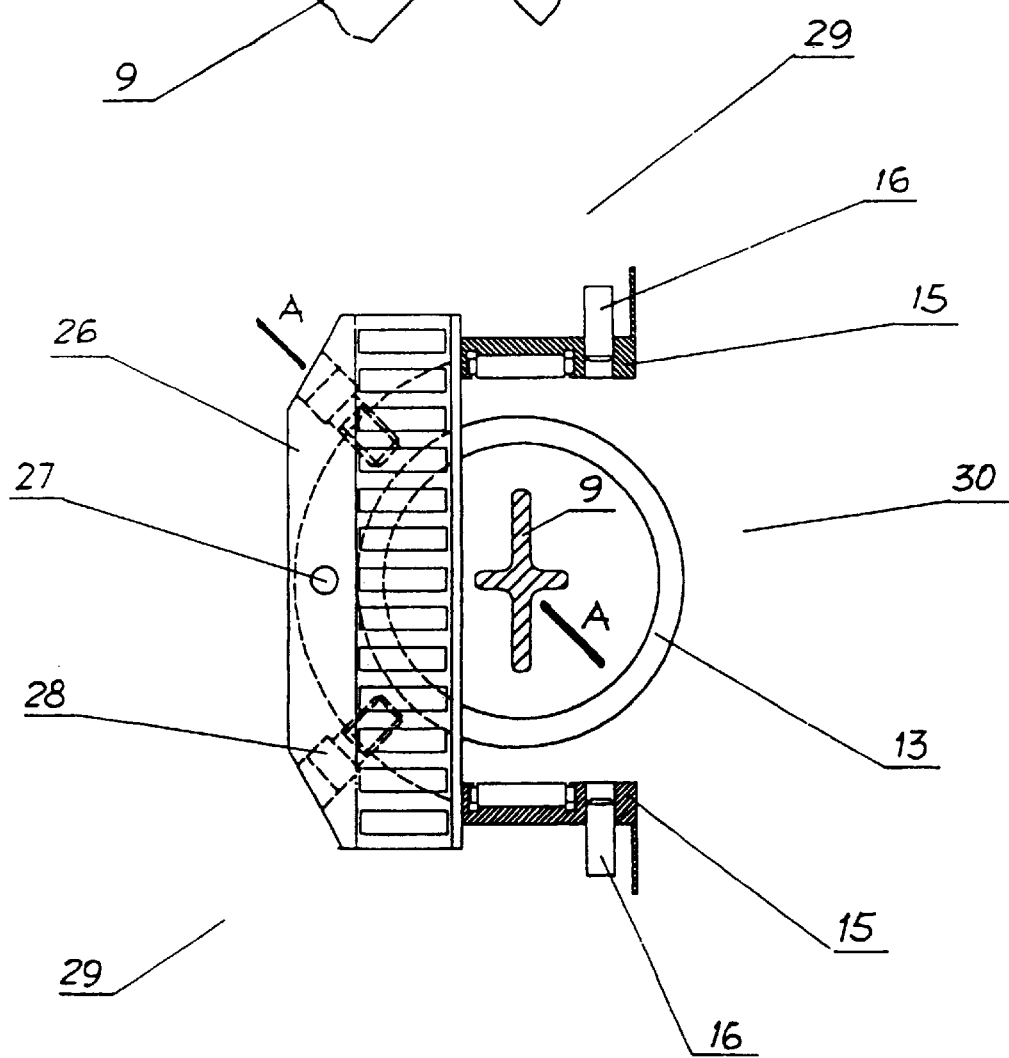
FIG. 5 is a simplified cross-sectional view, through line C—C in FIG. 1.

FIGS. 1 and 4 show that the rear eccentric wheel 7 has a similar assembly attached to it, including connecting rods and pistons 20–21 and 22–23, split anti friction bearing 24, skids 25, roller holder plates 26, positional spline 27 and attaching bolts 28 (FIGS. 5 and 6). It differs from the above-mentioned assembly in that it does not include gear 4 and obviously has neither pins 18 nor splines 19. No mention has been made of the two pairs of the opposite cylinders 29 and 30 which are not part of the invention but must be adapted in their shapes and sizes together with the oil pan.

Figure 8:
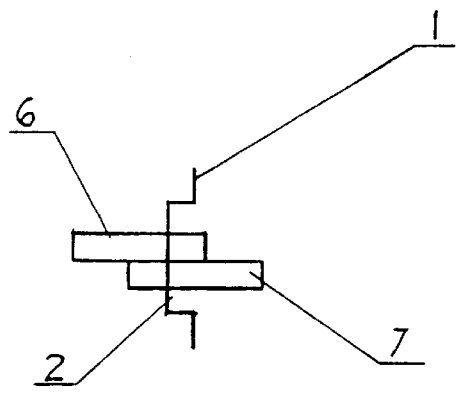
FIG. 8 is a schematic showing a cross-sectional view through line A—A in FIG. 7(A).
Figure 7:
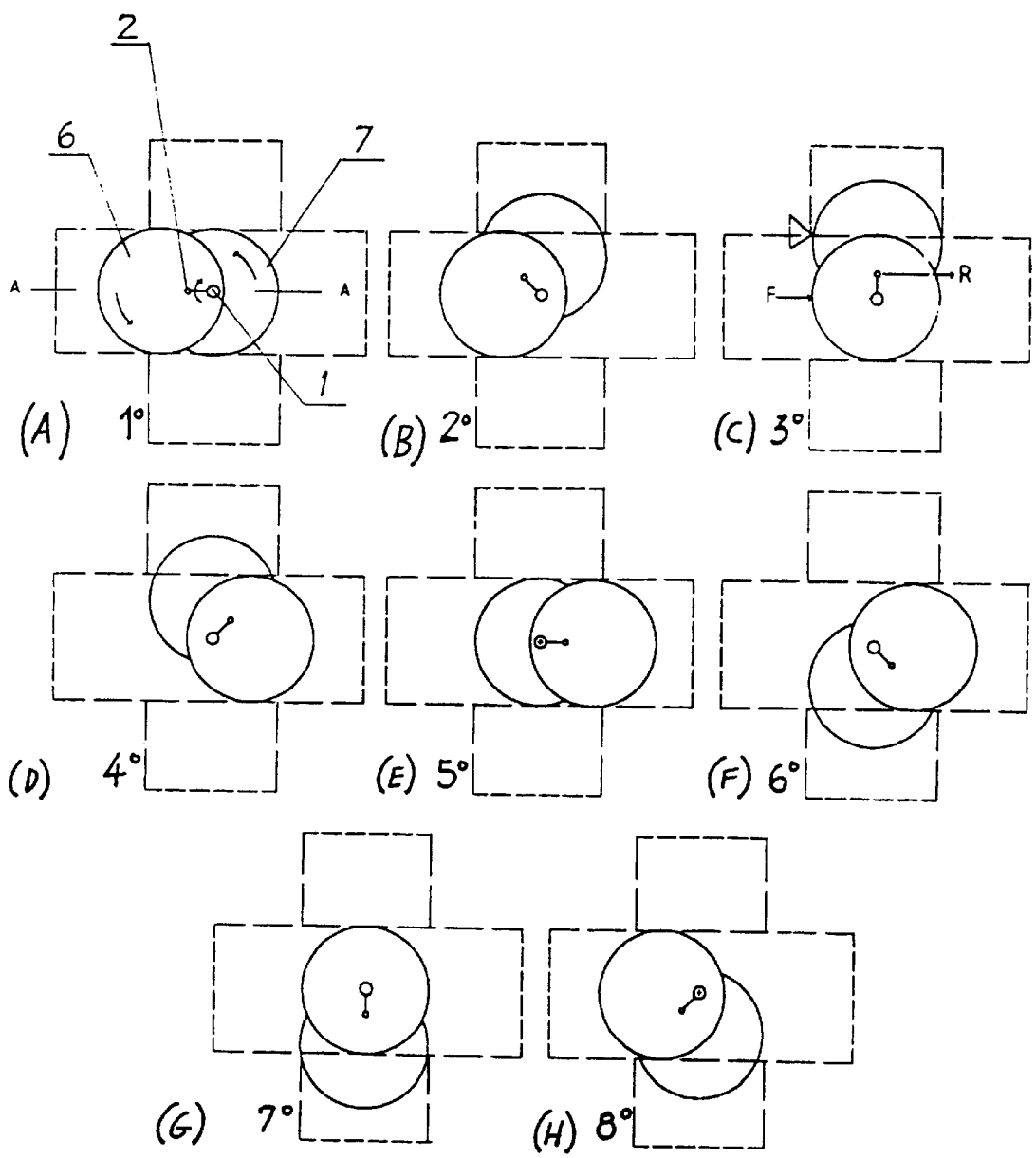
FIGS. 7(A)–(H) are a schematic showing a front view of the resultant position of the eccentric wheels at each 45° turn of the crankshaft.

The kinematic fundamentals of the present invention are as illustrated in FIGS. 7 and 8. These figures show a schematic of the mechanism, (starting in the same position as shown in FIG. 1), where only the crankshaft, its rotation axis 1 and its elbow 2 are shown, together with the front eccentric wheel 6, the rear eccentric wheel 7 and the channels on which they move. The path followed by the front eccentric wheel is drawn with horizontal dashed lines; the path followed by the rear eccentric wheel is drawn with vertical dashed lines. The lines represent the channels. A complete turn of the crankshaft is schematically shown at 45° intervals and the sequence follows the corresponding ordinal numbers. As the crankshaft turns clockwise, the eccentric wheels turn counterclockwise, as shown by arrows on FIG. 7(A).

On FIG. 7(C), the expansion force F that is transmitted by the connecting rod to the front eccentric wheel 6 is shown. This generates a momentum, with lever fulcrum on the spot symbolized by ▸ and the resulting force R with an intensity modulus twice F. The relation R/F=2 is held constant during the whole cycle.

What is claimed is:

1. A movement transmission mechanism for piston engines that allows transformation of linear movement into circular movement and vice-versa, including:

a crankshaft having a crankshaft elbow extending along an elbow axis and a rotatably mounted member on said crankshaft elbow, said rotatable mounted member defined by two grooved wheels disposed one behind the other so that their geometric wheel axes do not coincide, each of said wheels forming one of a front positioned eccentric and a rear positioned eccentric and moving on rotation of said rotatable mounted member;

a rotation axis located between and equally distant from each of the geometric wheel axes, said rotation axis corresponding to the elbow axis along which said crankshaft elbow extends;

said elbow axis and each of said geometric wheel axes being parallel to one another and lying on a single plane;

two bearing mounted connecting rods on said front positioned eccentric, a distal end of each of said connecting rods being a piston with no joint located between the piston and its associated connecting rod, each connecting rod being formed as a single piece with its associated piston;

said connecting rods being split head connecting rods having half-heads connected to each other by grooved pins, said connecting rods being opposed to each other and having a common longitudinal axis which coincides with axes of corresponding opposite cylinders;

a gear with inner cogs mounted on a front face of a head defined by said half-heads of the two bearing mounted connecting rods, the center and axis of said gear coinciding with the center and axis of a corresponding connecting rod bearing, said gear being fixed to and kept in position on said front face said head, said gear tangentially engaging an engaging segment of said crankshaft elbow, said crankshaft elbow having an engraved gear on the engaging segment;

the head defined by the half-heads forming two oppositely disposed parallel planes which are parallel to the common longitudinal axis, said planes sliding between two roller holder plates disposed opposite to each other; and two additional bearing mounted connecting rods mounted without a gear on said rear positioned eccentric.

2. The mechanism according to claim 1, wherein each piston and its corresponding connecting rod are cast in a single light-alloy piece.

3. The mechanism according to claim 1, wherein each head is a cover of a head to which it connects.

4. The mechanism according to claim 1, wherein a common bearing is used for the connecting rods whose half-heads are connected.

5. The mechanism according to claim 1, wherein said gear with inner cogs is divided into halves and is exactly positioned and attached by two lugs, two grooved pins and two splines.

6. The mechanism according to claim 1, wherein said engraved gear is a satellite of said gear with inner cogs and the number of cogs of said gear with inner cogs is equal to double the number of cogs of said satellite.

7. The mechanism according to claim 1, wherein said oppositely disposed parallel are covered by friction resistant steel.

8. The mechanism according to claim 1, wherein said roller holder plates are attached to the cylinder base by two screws.

\* \* \* \* \*